United States Patent Office.

FREDRICH WAGGERSHAUSER, OF CHICAGO, ILLINOIS.

PROCESS OF PRODUCING MEDICINAL WINE.

SPECIFICATION forming part of Letters Patent No. 344,227, dated June 22, 1886.

Application filed September 24, 1885. Serial No. 178,051. (No specimens.)

*To all whom it may concern:*

Be it known that I, FRED. WAGGERSHAUSER, a citizen of the United States, residing at Chicago, in the county of Cook and State of Illinois, have invented a new and useful Improvement in Process of Producing Medicinal Wine, of which the following is a specification.

My invention relates to a process of producing medicinal wine; and it consist in the various steps and means employed for producing a perfect fermentation, substantially as hereinafter fully described and claimed.

Good medicinal wine must possess the following qualifications: To quench the thirst, stimulate, cheer, and strengthen the human system, and consequently act as a restorative, and a means of compensation where a misappropriation occurs in nutrition. It must further provide protection against transient organic disturbances, must not affect the brain, and be easily digestible, and open its way out of the system after having performed its functions.

To secure wines possessing the qualifications above described, it is necessary to provide a process of fermentation amounting almost to perfection, and the wine must not contain any detrimental, fatty, or earthy substances.

All fruits cultivated on land containing a percentage of humus do not possess the strong characteristic features of fruit, &c., which has been cultivated on lean land, such characteristics being color, smell, taste, &c. This is especially the case with grapes cultivated in this country, as the earth contains but little of the required potash and salts which are necessary constituents of a good medicinal wine. The earth or ground in this country thus produces grapes which are very large and fatty, those of the southern portion being remarkably sweet, which produce a wine which is too fat, heavy, and containing alcohol. The wine thus produced is also deficient in the necessary requisite proportions of the proper acids and salts and yeast, and, by reason of the too great proportion of heavy fatty substances and the absence of the proper degree of acids, salts, and yeasts, the wine cannot be brought to the perfect state of fermentation which is necessary to produce a good healthy medicinal wine.

Through a course of experiments, embracing many years, in the manufacture of wines, I have found that a healthy and palatable wine can be produced from any kind or class of grapes, provided the necessary constituents are contained in the grapes and a careful fermentation is employed; and I have also found that good wine—as in German wines produced on the Rhine, Mosel, and Main—should contain the following ingredients in the proportion, in weight, presently designated, to wit: water, eighty-eight to ninety-two per cent.; alcohol, eight to ten per cent.; acids, one-fourth ($\frac{1}{4}$) to one-half ($\frac{1}{2}$) per cent.; salts, one-half ($\frac{1}{2}$) to three-fourths ($\frac{3}{4}$;) and a very small quantity of fine smelling ether, the exact quantity of which cannot be definitely ascertained.

It is a well-known fact that heavy and imperfectly-fermented wines are injurious to the human system, and especially so as they act on the nerves and brain, and when such wines are mixed with water they form an unpalatable and tasteless drink.

In contradistinction to heavy and imperfectly-fermented wines, the sour wines, besides containing free acids, also have too great a proportion of salts, particularly bitartrate of potash.

The good healthy wines—such as those secured by my improved process—purge the system and make their escape, after having performed their office, by reason of the salts and acids therein, and also serve to thin the blood and reduce it to the normal healthy state.

The best wines, particularly those produced in Germany, have a great proportion of salts, and the principal salts, or those of the largest proportion therein, are bitartrate of potash and common cooking-salt, which act upon the human system in the manner before described and with the beneficial results pointed out.

According to my process of producing a medicinal wine of a good, healthy, and palatable character, the grapes grown in this country are gathered when they contain about 0.45 to 0.70 per cent. of acid, and they are then reduced to wine and subjected to the ordinary process of fermentation in any preferred manner, and by any means or apparatus at present in use. When the principal or storming stage of fermentation occurs, which takes place in from eighteen to twenty-four hours after the juice has been pressed from the grapes, according to the temperature thereof, (whether 60° or 70° Fahrenheit,) chloride of sodium or ordinary cooking-salt is added to the wine in the proportion of two pounds of salt to one hundred (100) gallons of wine. The chloride of sodium or salt is decomposed during the process of fermentation of the wine, and combines with the acids and other earthy matters which the grapes take up from the earth—such as gypsum, lime, &c.—and forms tartar. The young wine is then placed or poured into a barrel or tank containing shavings of the hazel-nut tree, to permit the silent and stormy or after fermentation of the wine to take place, and permitted to remain therein for a few days, when the process of fermentation will be found to have been completed.

The hazel-nut-tree shavings before being placed in the tank or barrel are washed thoroughly in hot water, and then dried in the open air.

The peculiar and powerful fermenting qualities of shavings from the hazel-nut tree is due partly to the fact that they cause the yeast particles to come in frequent and intimate contact with the liquid or wine, and thus produce yeast, and partly due to the fact that the pores thereof contain air, which is given off to the liquid during the completion of the fermentation process.

Light young artificial wines contain about eight to ten per cent. of alcohol, and to thoroughly ferment them they are treated as above described; but when heavy wines are desired no alcohol must be added, but sugar until the wine contains about sixteen per cent. of alcohol. As the heavy wine containing this percentage of alcohol does not entirely and completely ferment, it is subjected to the action of the hazel-nut-tree shavings for a few days, as above described, and is reduced or brought to a perfect state of fermentation.

I have found by experiment that the shavings of the hazel-nut tree, when washed and dried in the open air, as described, are a very powerful and complete fermenting agent, and are very economical and cheap, and that a wine subjected to the action thereof and treated and having the proportion of salts added thereto, as above described, is very palatable, and possesses the necessary medicinal qualities above set forth, and that it can be used by invalids or persons in a healthy state with very good results.

By reason of the addition of salts, and the formation of acids and treatment above described the wine can be kept in warm climates, and can therefore be exported, can be diluted with water and will still remain palatable, with very much of the agreeable taste remaining with it, and the salts aid and quicken the process of fermentation.

I am aware that in the patent to Lachenmeyer, No. 216,868, of June 24, 1879, it is therein proposed to clear beer of yeast and other impurities by the employment of thin sheets of maple, birch, or hazel-wood of any convenient size, soaked in dissolved isinglass; but in my improved process it is not at all necessary to soak the shavings in a solution of isinglass, the shavings alone clarifying the wine in from six to ten days. Isinglass is very expensive, and often of a very disagreeable odor when dissolved, which makes it undesirable to use, aside from the fact that the solution of isinglass cannot be used in clarifying red wines, since it destroys the color.

I am also aware that it is old to apply salt to wine before fermentation. In my process I add the salt at what is termed the "principal stage of fermentation"—i e., after the first or stormy stage—and during the second stage, when the conversion of the sugar into alcohol is not completed, and therefore the acid is not free. The addition of salt at an earlier stage—say, for instance, before fermentation—would tend to impede and obstruct the fermentation, and it also imparts to the wine a very disagreeable salty taste, which is made to disappear only by lapse of time. When the salt is added during the second stage of fermentation, this disagreeable salty taste does not appear, as I have found by actual experiments, the salt, by the close commingling which takes place during this stage, combining with the chief elements of the wine—viz., acid and alcohol. When undergoing natural fermentation heavy southern wines—California wine, for instance—the stage of complete fermentation is not reached for the second or third year, when all the sugar is converted into alcohol and the acids entirely set free.

Having thus fully described my invention, what I claim as new, and desire to secure by Letters Patent, is—

1. The process of producing medicinal wine, consisting in the addition of salt or chloride of sodium to the wine after the first or stormy stage of fermentation and during the second stage, when the conversion of the sugar into alcohol is not yet completed, as set forth.

2. The process of producing medicinal wine, consisting in the addition of salt or chloride of sodium to the wine after the first or stormy stage of fermentation and during the second stage, before the sugar in the wine is completely converted into alcohol, and then subjecting the wine during the silent fermentation to the action of plain shavings from the hazel-nut tree, as set forth.

In testimony that I claim the foregoing as my own I have hereto affixed my signature in presence of two witnesses.

FRED. WAGGERSHAUSER.

Witnesses:
FRIDOLIN GREINER,
HERMAN KAAGE.